United States Patent
Waters (10) Patent No.: US 7,279,633 B2
(45) Date of Patent: Oct. 9, 2007

(54) APPARATUS FOR PROVIDING AN ELECTRICAL WIRING HUB

(76) Inventor: Robert Waters, 456 Little Mountain Cir., Inman, SC (US) 29349

( * ) Notice: Subject to any disclaimer, the term of this patent is extended or adjusted under 35 U.S.C. 154(b) by 0 days.

(21) Appl. No.: 11/343,373

(22) Filed: Jan. 31, 2006

(65) Prior Publication Data

US 2006/0169472 A1    Aug. 3, 2006

Related U.S. Application Data

(60) Provisional application No. 60/593,635, filed on Jan. 31, 2005.

(51) Int. Cl.
*H02G 3/08* (2006.01)
(52) U.S. Cl. ............................. 174/50; 174/59; 174/60; 439/535; 439/949
(58) Field of Classification Search ................ 174/50, 174/53, 57, 58, 17 R, 480, 481, 60, 59; 439/721, 439/112, 535, 537, 949; 220/3.2, 3.3, 3.4, 220/3.5, 3.6, 3.7, 3.8, 3.9, 4.02; 361/600, 361/728, 730, 724, 823
See application file for complete search history.

(56) References Cited

U.S. PATENT DOCUMENTS

| | | | |
|---|---|---|---|
| 1,426,210 A | 8/1922 | O'Neil | |
| 2,427,965 A | 9/1947 | Henderson | 174/59 |
| 2,528,989 A | 11/1950 | Ammells | 174/59 |
| 2,574,608 A | 11/1951 | Ziph | 174/88 |
| 3,895,268 A | 7/1975 | May et al. | 317/120 |
| 3,922,478 A * | 11/1975 | Perkey | 174/53 |
| 3,949,155 A | 4/1976 | Bourne | 174/55 |
| 4,050,770 A * | 9/1977 | Rigo | 174/59 |
| 4,071,159 A | 1/1978 | Robinson et al. | 220/3.2 |
| 4,194,644 A | 3/1980 | Narvaez | 220/3.3 |
| 4,403,106 A | 9/1983 | Lask et al. | 174/59 |
| 4,425,016 A | 1/1984 | Denckert | 339/82 |
| 4,513,994 A | 4/1985 | Dover et al. | 248/544 |
| 4,540,847 A | 9/1985 | Gardner | 174/48 |
| 4,645,286 A | 2/1987 | Isban et al. | 339/125 |
| 4,667,840 A | 5/1987 | Lindsey | 220/3.2 |
| 4,724,281 A | 2/1988 | Nix et al. | 174/53 |
| 4,738,634 A | 4/1988 | Taylor et al. | 439/441 |
| 4,780,088 A | 10/1988 | Means | 439/107 |
| 4,788,383 A | 11/1988 | Caison | 174/54 |
| 4,948,317 A | 8/1990 | Marinaro | 411/535 |
| 4,972,044 A | 11/1990 | Kropa | 174/65 |
| 5,052,950 A | 10/1991 | Wilson | 439/709 |
| 5,212,346 A | 5/1993 | Clark | 174/59 |
| 5,216,203 A | 6/1993 | Gower | 174/65 |
| 5,295,842 A | 3/1994 | Ozaki et al. | 439/76 |
| 5,326,933 A | 7/1994 | Freundner et al. | 174/53 |
| 5,387,066 A | 2/1995 | Zekowski | 411/390 |
| 5,415,564 A | 5/1995 | Winter et al. | 439/535 |

(Continued)

*Primary Examiner*—Angel R. Estrada
(74) *Attorney, Agent, or Firm*—Thomas, Kayden, Horstemeyer, and Risley, LLP (57) ABSTRACT

An apparatus for an electrical wiring hub is provided. The electrical wiring hub includes: a hub housing, configured to receive a plurality of wires; a plurality of conductor rings, configured to conduct electrical current from one of the plurality of wires to another of the plurality of wires; a conductor mount, configured to receive at least one conductor ring; a conductor retainer, configured engage the hub housing and the conductor mount and configured to maintain a position of the plurality of conductor rings.

27 Claims, 7 Drawing Sheets

U.S. PATENT DOCUMENTS

| | | | |
|---|---|---|---|
| 5,434,356 A | 7/1995 | Zekowski | 174/48 |
| 5,471,012 A * | 11/1995 | Opel | 174/53 |
| 5,525,754 A | 6/1996 | Akins | 174/53 |
| 5,560,101 A | 10/1996 | Sandell et al. | 29/868 |
| 5,657,871 A | 8/1997 | Waters et al. | 206/509 |
| 5,698,820 A | 12/1997 | Collard | 174/57 |
| 5,718,047 A | 2/1998 | Nakayama et al. | 29/845 |
| 5,728,971 A | 3/1998 | Nash | 174/50.52 |
| 5,734,125 A | 3/1998 | Yasukuni et al. | 174/52.2 |
| 5,735,711 A | 4/1998 | Fremgen | 439/578 |
| 5,747,737 A | 5/1998 | Waehner | 174/59 |
| 5,822,189 A | 10/1998 | Isshiki | 361/736 |
| 5,831,213 A | 11/1998 | Wright et al. | 174/64 |
| 5,883,332 A | 3/1999 | Collard | 174/57 |
| 5,920,034 A | 7/1999 | Saka et al. | 174/59 |
| 5,921,795 A | 7/1999 | Weener et al. | 439/215 |
| 5,925,850 A | 7/1999 | Park | 174/60 |
| 5,936,200 A | 8/1999 | Park | 174/59 |
| 6,027,359 A | 2/2000 | Aoki et al. | 439/357 |
| 6,051,782 A | 4/2000 | Wagner | 174/52.1 |
| 6,075,478 A | 6/2000 | Abe | 341/155 |
| 6,121,548 A | 9/2000 | Matsuoka | 174/59 |
| 6,137,054 A | 10/2000 | Uezono et al. | 174/59 |
| 6,186,838 B1 | 2/2001 | Foster | 439/797 |
| 6,191,361 B1 | 2/2001 | Matty | 174/53 |
| 6,191,362 B1 | 2/2001 | Gretz | 174/58 |
| 6,196,882 B1 | 3/2001 | Sato et al. | 439/701 |
| 6,207,898 B1 | 3/2001 | Reiker | 174/61 |
| 6,231,358 B1 | 5/2001 | Kerr, Jr. et al. | 439/140 |
| 6,267,613 B1 | 7/2001 | McCoy et al. | 439/281 |
| 6,268,563 B1 | 7/2001 | Gretz | 174/53 |
| 6,335,486 B1 | 1/2002 | Reiker | 174/51 |
| 6,355,882 B1 | 3/2002 | Gretz | 174/53 |
| 6,361,333 B1 | 3/2002 | Cash, Jr. | 439/106 |
| 6,364,670 B1 | 4/2002 | Wickett et al. | 439/76.2 |
| 6,379,164 B1 | 4/2002 | Cash, Jr. | 439/106 |
| 6,379,170 B1 | 4/2002 | Czeschka et al. | 439/291 |
| 6,428,190 B1 | 8/2002 | Herst et al. | 362/391 |
| 6,428,331 B1 | 8/2002 | Yamakawa et al. | 439/76.2 |
| 6,430,054 B1 | 8/2002 | Iwata | 361/752 |
| 6,537,094 B2 | 3/2003 | McCoy et al. | 439/281 |
| 6,544,049 B1 | 4/2003 | Pierson, Jr. | 439/107 |
| 6,545,217 B2 | 4/2003 | Sato | 174/50 |
| 6,555,750 B2 | 4/2003 | Kiely | 174/65 |
| 6,558,190 B1 | 5/2003 | Pierson, Jr. | 439/535 |
| 6,570,088 B1 | 5/2003 | Depp et al. | 174/50 |
| 6,583,353 B2 | 6/2003 | Murakoshi et al. | 174/50 |
| 6,586,672 B2 * | 7/2003 | Kobus et al. | 174/50 |
| 6,586,679 B2 | 7/2003 | Bashford | 174/58 |
| 6,600,658 B2 | 7/2003 | Iwata | 361/752 |
| 6,605,780 B2 | 8/2003 | Chiriku et al. | 174/60 |
| 6,607,115 B2 | 8/2003 | Kobayashi et al. | 228/101 |
| 6,610,926 B2 | 8/2003 | Chiriku et al. | 174/60 |
| 6,617,511 B2 | 9/2003 | Schultz et al. | 174/53 |
| 6,623,311 B1 | 9/2003 | Dehan | 439/721 |
| 6,627,815 B1 | 9/2003 | Ebersole | 174/53 |
| 6,634,901 B2 | 10/2003 | Kerr, Jr. | 439/333 |
| 6,659,792 B2 | 12/2003 | Saka et al. | 439/367 |
| 6,693,370 B2 | 2/2004 | Yamane et al. | 307/10.1 |
| 6,705,478 B1 | 3/2004 | Engle | 213/1.3 |
| 6,722,430 B2 | 4/2004 | Vinegar et al. | 166/250.01 |
| 6,733,331 B2 | 5/2004 | McCoy et al. | 439/535 |
| 6,736,715 B2 | 5/2004 | Kuhn | 451/868 |
| 6,740,813 B1 | 5/2004 | Gretz | 174/66 |
| 6,777,611 B2 | 8/2004 | Ewald et al. | 174/50 |
| 6,780,026 B2 | 8/2004 | Sato | 439/76.2 |
| 6,780,049 B1 | 8/2004 | D'Angelo et al. | 439/537 |
| 6,784,365 B2 | 8/2004 | Ohashi et al. | 174/50 |
| 6,796,809 B2 | 9/2004 | Kakuta et al. | 439/76.2 |
| 6,800,807 B2 | 10/2004 | Ishiguro et al. | 174/50 |
| 6,811,426 B2 | 11/2004 | Marioni | 439/374 |
| 6,813,595 B2 | 11/2004 | Edgar | 703/8 |
| 6,822,163 B2 | 11/2004 | Saneto et al. | 174/50 |
| 6,870,096 B2 | 3/2005 | Suzuki et al. | 174/50 |
| 6,870,097 B2 | 3/2005 | Oda | 174/50 |
| 6,875,923 B2 | 4/2005 | Egawa et al. | 174/68.2 |
| 6,878,878 B2 | 4/2005 | Westlake | 174/66 |
| 6,919,509 B2 | 7/2005 | Oda | 174/59 |
| 6,932,625 B2 | 8/2005 | Yagi et al. | 439/76.2 |
| 6,945,815 B1 | 9/2005 | Mullally | 439/535 |
| 6,953,895 B2 | 10/2005 | L'Henaff et al. | 174/59 |
| 6,971,888 B2 | 12/2005 | Takeuchi et al. | 439/76.2 |
| 2006/0105626 A1 * | 5/2006 | Scott | |

\* cited by examiner

APPARATUS FOR PROVIDING AN ELECTRICAL WIRING HUB

CROSS-REFERENCE TO RELATED APPLICATION

This application claims priority to copending U.S. provisional application entitled, "ELECTRICAL WIRING HUB," having Ser. No. 60/593,635, filed Jan. 31, 2005, which is entirely incorporated herein by reference.

TECHNICAL FIELD

The present disclosure is generally related to electrical wiring devices and, more particularly, is related to an apparatus for providing an electrical wiring hub junction box.

BACKGROUND

An electrical circuit feeds electrical power from a main power line to every electrical outlet, switch, and fixture therewith. Concomitant to every electrical power system are electrical junction boxes configured to connect and distribute the electrical circuit to the various loads and controllers. Previous junction boxes have consisted of a metal or plastic box having a cover, romex connectors, and Wire-Nuts®. Once the wires were secured to the box, common wires were joined together within the box using a Wire-Nut®. Additionally, sometimes a piece of electrical tape was added to prevent the Wire-Nut® from coming loose.

One method of overcoming the limitations of the early methods has been achieved in the prior art by providing a junction box containing three circuit boards that correspond to, for example, the line, neutral, and ground wires. Each of the circuit boards included multiple terminals occupied by termination fasteners. Some of the prior art techniques included the use of circuit boards arranged in multiple rows to eliminate the need to cross the wires from different circuits within the junction box. These approaches to providing a junction box, however, do not typically include a desirable form factor that is consistent with present electrical practices. Further, the rows of terminals are time consuming to terminate. Additionally, the circumstance where the junction box is utilized to attach fixtures, receptacles, or switches remains unaddressed in an improved junction box. Thus, a heretofore-unaddressed need exists in the industry to address the aforementioned deficiencies and inadequacies.

SUMMARY

Embodiments of the present disclosure provide an apparatus for providing an electrical wiring hub. Briefly described, one embodiment of an electrical wiring apparatus includes: a hub housing, configured to receive a plurality of wires; a plurality of conductor rings, configured to conduct electrical current from one of the plurality of wires to another of the plurality of wires; a conductor mount, configured to receive at least one conductor ring; a conductor retainer, configured engage the hub housing and the conductor mount, the conductor mount further configured to maintain a position of the plurality of conductor rings.

An embodiment of the present disclosure can also be viewed as an electrical wiring apparatus, including: a hub housing, having an opening with a first shape and having a first groove corresponding to the first shape, the hub housing configured to receive a plurality of wires from a plurality of directions; first conductor configured to be received by the first groove; a conductor mount, configured to be received by the opening and having a second groove configured to receive a second conductor and a third groove configured to receive a third conductor; and a conductor retainer, configured to engage the hub housing and retain the first conductor and further configured to engage the conductor mount and retain the second conductor and the third conductor.

Embodiments of the present disclosure can be further viewed as an electrical wiring apparatus including: means for receiving a plurality of wires within an enclosure having a first geometry; means for conducting electrical current along a path corresponding to the first geometry from one of the plurality of wires to another of the plurality of wires; means for mounting the conducting means within the enclosure; means for securing the mounting means relative to the conducting means and the receiving means; and means for fastening the plurality of wires to the conducting means.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
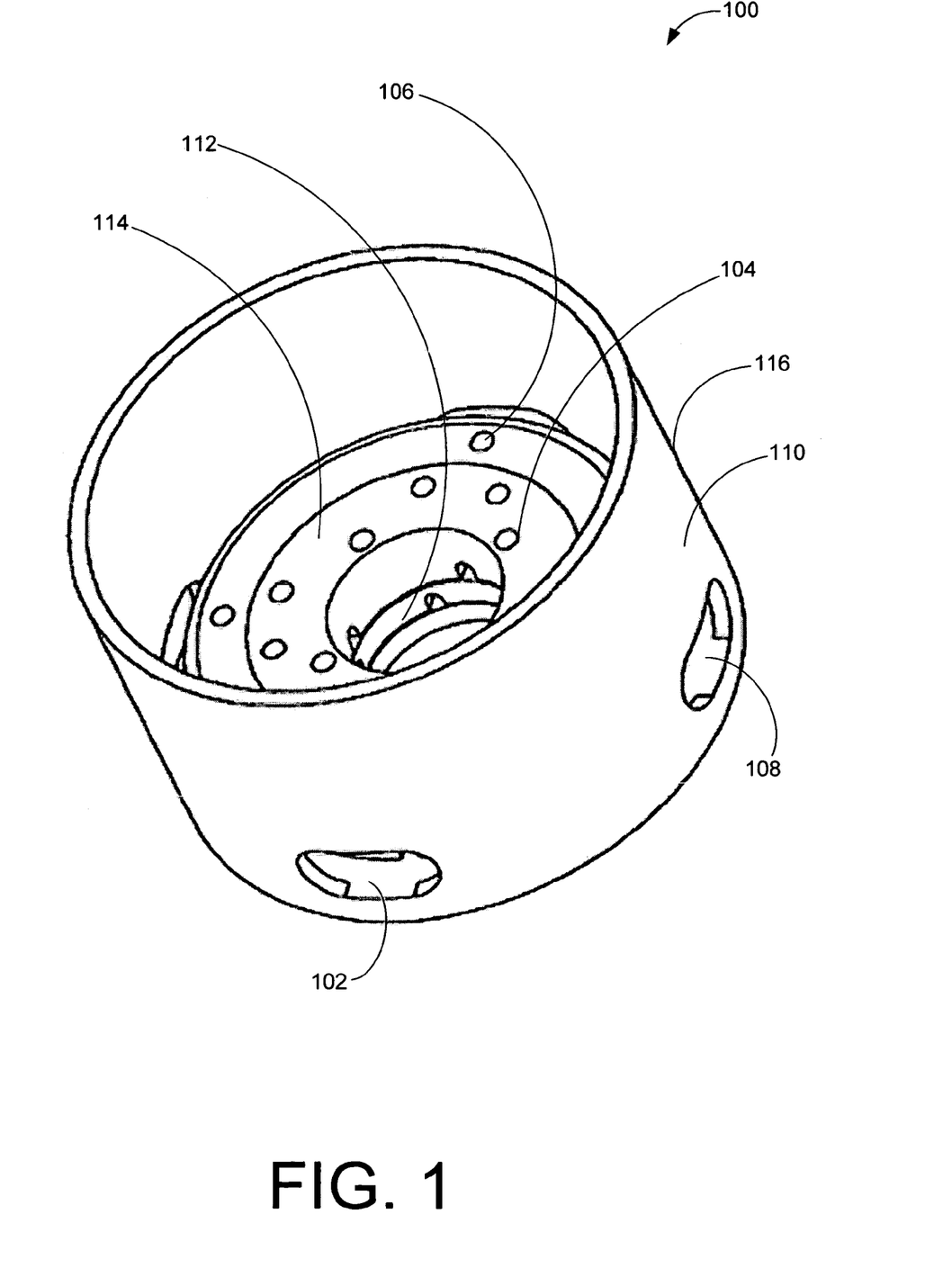
FIG. 1 is perspective view of an exemplary apparatus for providing an electrical wiring hub as disclosed herein.

Reference is now made to FIG. 1, which is a perspective view of an exemplary apparatus for providing an electrical wiring hub. The electrical wiring hub 100 includes a hub housing 116 consisting of, for example, a hub housing bottom wall 108 and a hub housing side wall 110. Although an embodiment as illustrated includes only a single circular housing side wall 110, the hub housing 116 could include multiple housing side walls forming a housing having a shape of, for example, some polygonal geometry. For example, the hub housing 116 could include four housing side walls resulting in a square, rectangular, or trapezoidal shape, among others. The hub housing 116 can be manufactured using a variety of structurally stable non-conductive materials including but not limited to injection molded plastic. Examples of materials include non-conductive materials including polymeric and ceramic, among others. Other materials or methods of manufacture are contemplated within the scope and spirit of this disclosure.

The electrical wiring hub 100 further includes at least one cavity 102 for receiving electrical wires. In this manner, electrical wires can enter the enclosure defined by the hub housing 116 for termination. Some embodiments can include multiple cavities 102 for receiving electrical wires through the side walls or the bottom wall of the hub housing 116. The electrical wiring hub 100 also includes a conductor mount 112, configured to receive the conductors that are utilized to define the circuits within the electrical wiring hub 100. The electrical wiring hub 100 further includes a conductor retainer 114 that is configured to retain the conductors on the conductor mount 112. Assembly fasteners 104 are configured to retain the relative position of the hub housing 116, the conductor mount 112, and the conductor retainer 114. Termination fasteners 106 are configured to maintain conductive contact and thus an electrical connection between electrical wires (not shown) and the conductors (not shown) in the electrical wiring hub 100.

Figure 2:
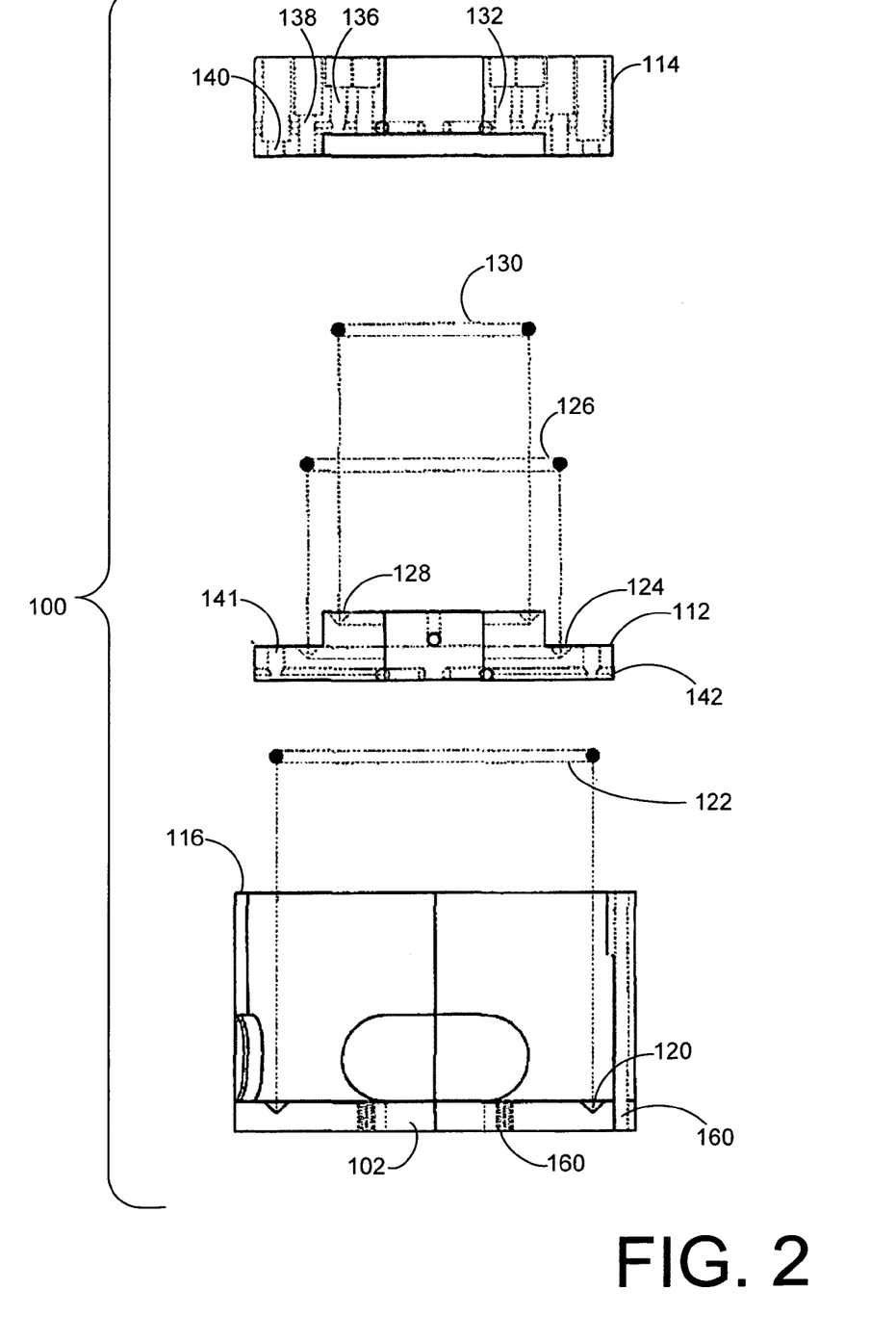
FIG. 2 is an exploded side view illustrating exemplary components and exemplary internal structures of the apparatus of FIG. 1.

Reference is now made to FIG. 2, which is an exploded side view illustrating exemplary components and exemplary internal structures of the apparatus of FIG. 1 as discussed above, regarding FIG. 1. The electrical wiring hub 100 includes a hub housing 116, a conductor retainer 114 and a conductor mount 112. The conductor mount 112 receives a first conductor ring 130 into a first recessed area 128. Although the first recessed area 128 is illustrated as a v-shaped groove, the v-shaped profile of the first recessed area 108 is merely exemplary and not intended to limit the spirit or scope of this disclosure in any way. For example, the recessed area 128 can be configured as a groove having a circular or square profile or cross section. The conductor mount 112 also includes a second recessed area 124 configured to receive a second conductive ring 126.

The hub housing 116 includes a third recessed area 120 configured to receive a third conductor ring 122. When the third conductor ring 122 is placed in the third recessed area 120 and a conductor mount 112 is positioned within the hub housing 116, the conductor mount 112 maintains the position of the third conductor ring 122. Similarly, when the first conductor ring 130 and the second conductor ring 126 are placed in the first recessed area 128 and the second recessed area 124 respectively, and the conductor retainer 114 is placed in the hub housing 116 in contact with the conductor mount 112, the first and second conductor rings 126, 130 are retained. As illustrated, each of the conductor rings has a different diameter such that there is an inner, a middle, and an outer conductor ring.

The conductor retainer 114 also includes assembly fastener cavities 132 for receiving assembly fasteners (not shown). The assembly fasteners in some embodiments are inserted into the assembly fastener cavity 132 passed through a similar cavity in the conductor mount 112 and can threadably engage the hub housing 116 utilizing assembly fastening threads 134. Assembly fasteners can include bolts, screws, nuts, and other threaded fasteners, among others. When installed, the assembly fasteners maintain the relative positions between the hub housing 116, the conductor mount 112, the conductor retainer 114, and the first, second, and third conductor rings 130, 126, and 122.

The conductor retainer 114 further includes first circuit termination fastener cavities 136 configured to receive fasteners for maintaining the conductive engagement between wires (not shown) in a first circuit or branch and the first conductor ring 130. Similarly, the conductor retainer 114 further includes second circuit termination fastener cavities 138 configured to create and maintain conductive engagement between wires (not shown) in a second circuit or branch and the second conductive ring 126. The conductor retainer 114 also includes third circuit termination fastener cavities 140 configured to support the electrical termination of wires (not shown) to the third conductor ring 122.

The conductor mount 112 also includes third circuit termination fastener cavities 141 for providing electrical terminations to the third conductor ring 122, which is between the conductor mount 112 and the hub housing 116. A third circuit wire channel 142 is formed in the conductor mount 112, to receive wires for conductive engagement with the third conductor ring 122.

Figure 3A:
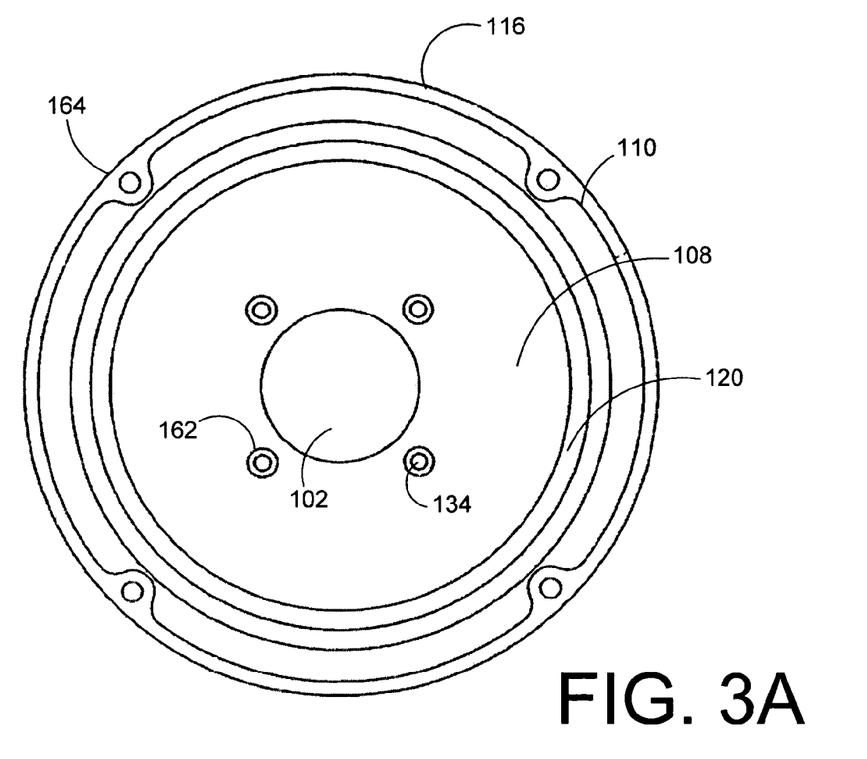
FIGS. 3A and 3B are top and side views, respectively, illustrating an exemplary hub housing and corresponding internal structures as disclosed herein.
Figure 3B:
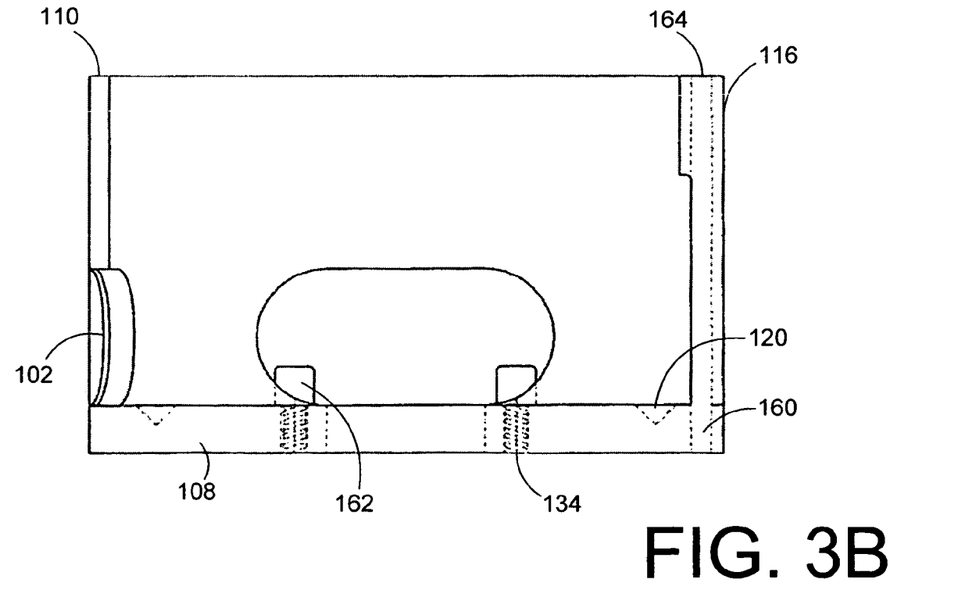

Reference is now made to FIGS. 3A and 3B, which are top and side views, respectively, illustrating an exemplary hub housing and exemplary internal structures. The hub housing 116 includes a housing bottom wall 108 and at least one housing side wall 110. As discussed above, a circular configuration of embodiments herein are presented merely by way of example and are not intended to limit the scope or spirit of the disclosure. For example, the hub housing 116 can be configured as a square or other polygonal structure. The hub housing 116 includes the third recessed area 120 configured to receive the third conductor ring 122. Additionally, cavities 102 for receiving electrical wires can be formed in the housing side wall 110, the housing bottom wall 108, or some combination thereof.

As illustrated in FIG. 3B, the housing bottom wall 108 can also include a mounting fastener cavity 160, configured to receive fasteners for mounting the electrical wiring hub 100 to a surface or structure. Cover mounting fastener threads 164 can be configured to receive threaded fasteners utilized to secure a cover or fixture. Spacers 162 can also be included for maintaining a predetermined distance between the inside surface of the housing bottom wall 108 and a conductor mount 112.

Figure 4A:
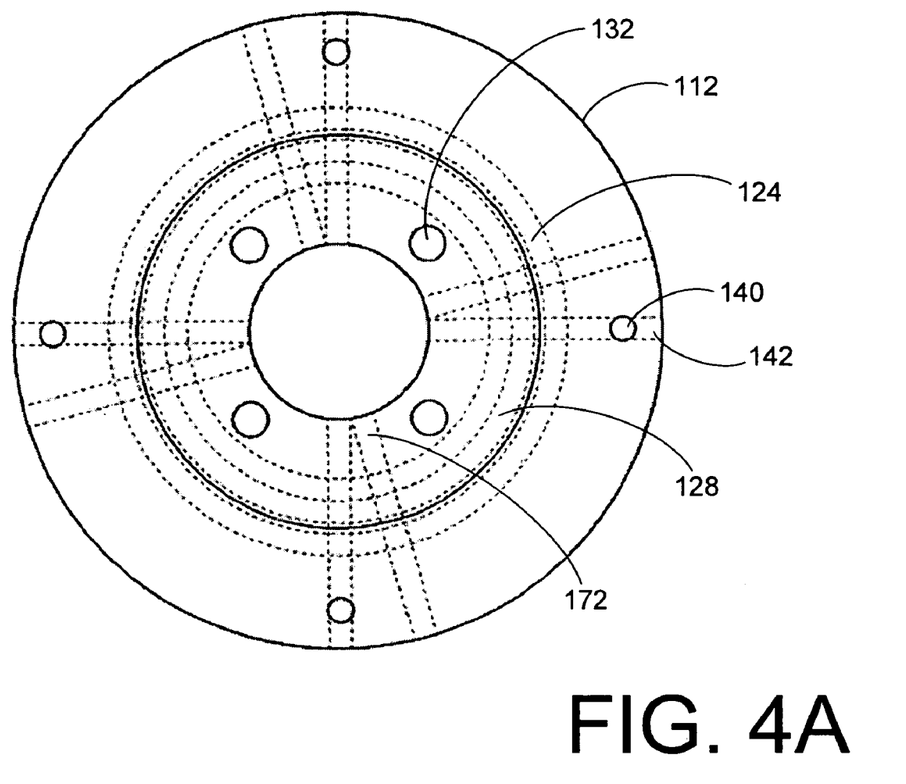
FIGS. 4A and 4B are top and side views, respectively, illustrating an exemplary embodiment of a conductor mount and corresponding internal structures as disclosed herein.
Figure 4B:
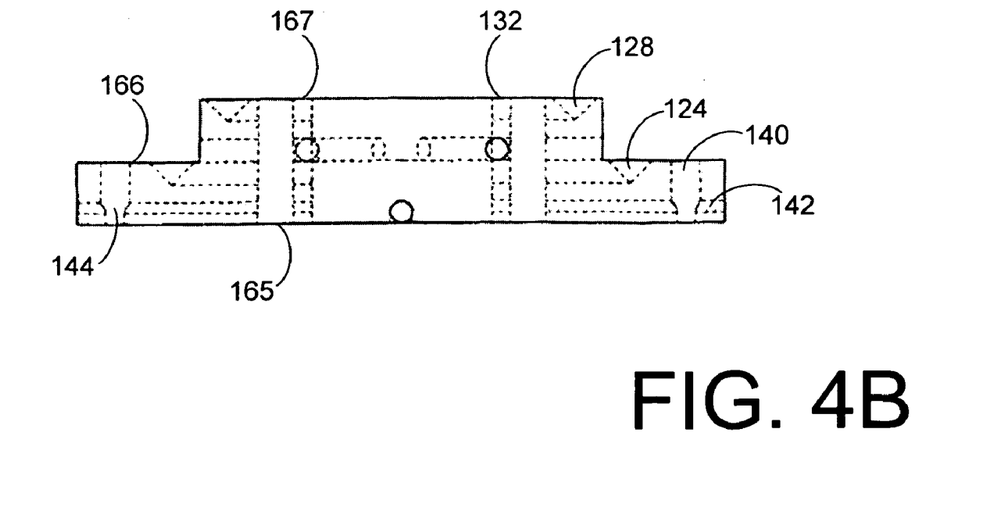

Reference is now made to FIGS. 4A and 4B, which are top and side views, respectively, illustrating an exemplary conductor mount and exemplary internal structures therein. The conductor mount 112 includes an assembly fastener cavity 132 configured to accommodate the assembly fasteners that go from the conductor retainer 114 (not shown) through the conductor mount 112 to the hub housing 116 (not shown). The conductor mount 112 is configured to have a first surface 165 that engages the inside surface of the bottom wall of the hub housing when the electrical wiring hub is assembled.

The conductor mount 112 also includes a second surface 166 that is parallel to the first surface 165. The second surface includes the second recessed area 124, which is configured to receive the second conductor ring 126 (not shown). The outside boundaries of the second surface 166 generally correspond to the perimeter of the first surface 165. An inner boundary of the second surface 166 is generally located just and proximate to the second recessed area 124.

The conductor mount also includes a third surface 167 that is parallel to the first surface and is a greater distance from the first surface 165 than the second surface 166 is from the first surface 165. The third surface 167 includes the first recessed area 128 configured to receive the first conductor ring 130. The conductor mount 112 also includes third circuit termination fastener cavities 140 configured to receive the termination fasteners for generating and maintaining conductive engagement between third circuit wires and the third conductor ring 122. The conductor mount 112 also includes second circuit wire channels 172 and third circuit wire channels 142 for receiving wires adjacent their respective conductor rings. The conductor mount 112 can be manufactured using a variety of structurally stable non-conductive materials including but not limited to injection molded plastic. Other materials or methods of manufacture are contemplated within the scope and spirit of this disclosure.

Figure 5A:
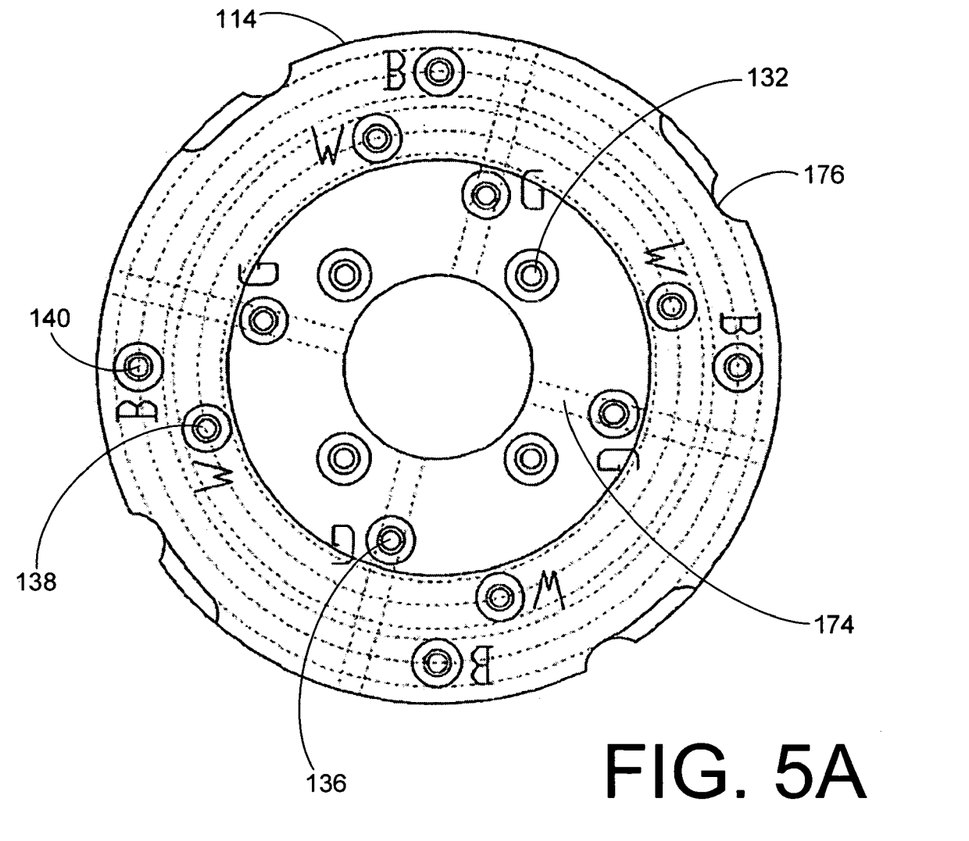
FIGS. 5A and 5B are top and side views, respectively, illustrating an exemplary embodiment of a conductor retainer and corresponding internal structures as disclosed herein.
Figure 5B:
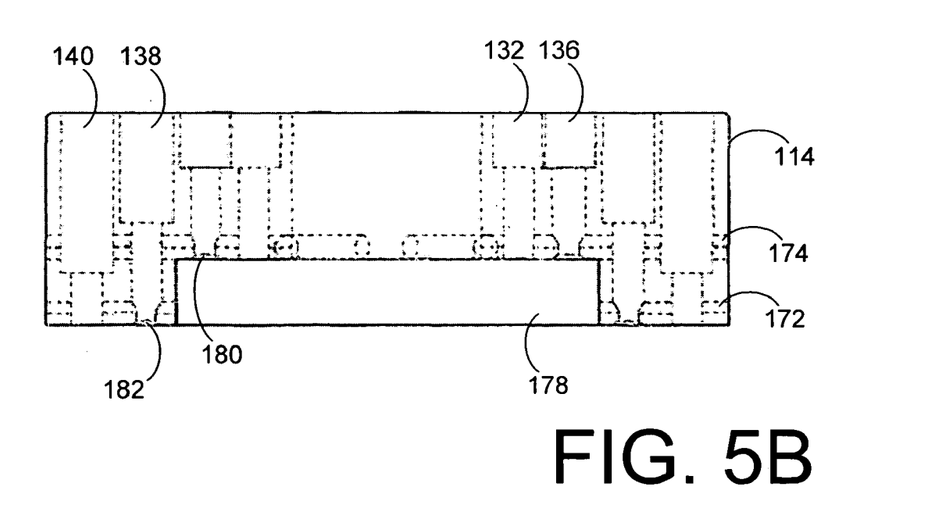

Reference is now made to FIGS. 5A and 5B, which are top and side views, respectively, illustrating an exemplary conductor retainer and exemplary internal structures. The conductor retainer 114 includes assembly fastener cavities 132 configured to receive fasteners for assembly of the electrical wiring hub. The assembly fasteners serve to maintain the relative positions of the housing, the conductor mount, the conductor retainer, and the conductor rings. The conductor retainer 114 also includes circuit identifier markings configured to identify which conductor ring circuits a particular termination fastener corresponds to. A circuit identifier marking corresponds to the location of the adjacent cavity relative to the conductor rings. For example, a different circuit identifier marking can be utilized for each of a first circuit termination fastener cavity 136(G), a second circuit termination fastener cavity 138(W), and a third circuit termination fastener cavity 140(B).

In addition to providing reliable access from the front of the electrical wiring hub, the termination fasteners are recessed or counter-sunk below the surface of the conductor retainer to reduce the likelihood of unintentional contact with energized circuits. Additionally, the accessibility of the termination fasteners through the termination fastener cavities 136, 138 and 140 provide easy and safe access for probes associated with voltage testing and other circuit analysis tasks. The conductor retainer 114 also includes a first circuit wire channel configured to receive wires corresponding to the first circuit for conductive engagement with the first conductor ring.

An assembly guide section 176 can be configured to receive collars located on the inside perimeter of the hub housing. Assembly is performed by aligning the assembly guide section 176 with a corresponding perimeter locking collar on the hub housing. The conductor retainer 114 is pushed into the hub housing until the outer surface of the conductor retainer 114 is beyond the perimeter locking collar. At this time, the conductor retainer 114 can be rotated to lock the assembly behind the perimeter locking collars. This assembly guide section and perimeter locking collar combination can be used in addition to or in lieu of assembly fasteners in some embodiments. Alternatively, the assembly fasteners can be used exclusively to maintain the relative positions of the electrical wiring hub components. The conductor retainer 114 also includes a recess 178 for receiving the third surface portion of the conductor mount. A first circuit upper engagement section 180 and a second circuit upper engagement section 182 engage the top surfaces of the first and second conductor rings, respectively, when the electrical wiring hub is assembled. The conductor retainer 114 can be manufactured using a variety of structurally stable non-conductive materials including but not limited to injection molded plastic. Other materials or methods of manufacture are contemplated within the scope and spirit of this disclosure.

Figure 6:
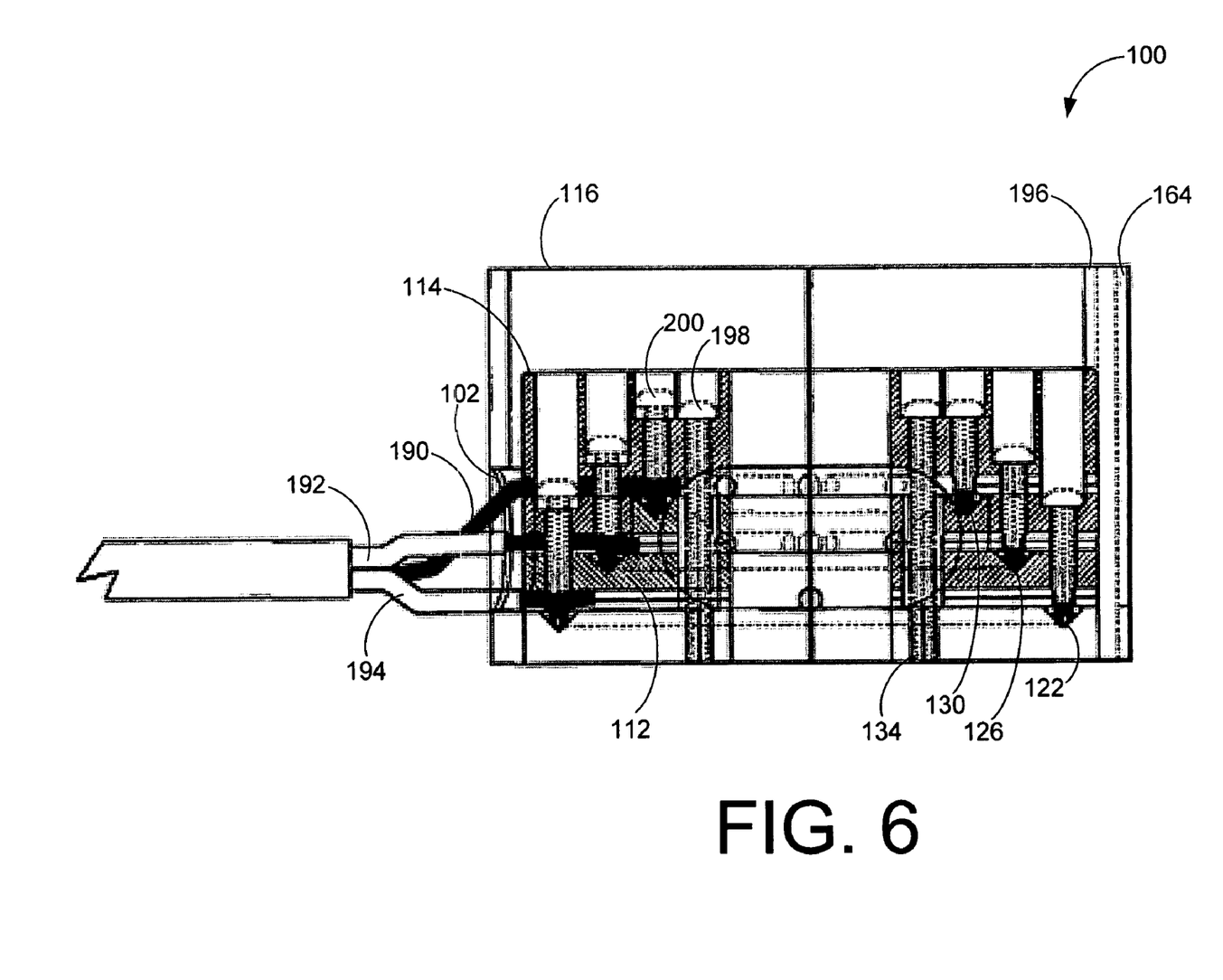
FIG. 6 is a side view illustrating an embodiment of an apparatus and corresponding internal structures for providing an electrical wiring hub as disclosed herein.

Reference is now made to FIG. 6, which is a side view illustrating an embodiment of an apparatus and exemplary internal structures for providing an electrical wiring hub. As shown, the electrical wiring hub 100 is assembled with exemplary wire terminations. The assembly fasteners 198 engage the assembly fastening threads 134 to maintain the relative positions of the hub housing 116, the conductor mount 112, the conductor retainer 114, and the conductor rings 122,126, and 130. A first circuit wire 190 enters the cavity 102 for receiving electrical wires through the appropriate wire channel and is conductively engaged by a termination fastener 200 against the first conductor ring 130.

Similarly, a second circuit wire 192 enters the cavity for receiving electrical wires 102 and travels through a second circuit wire channel and is conductively engaged with a second conductor ring 126 utilizing a termination fastener 200. A third circuit wire 194 is similarly engaged with the third conductor ring 122 utilizing a termination fastener 200. The electrical wiring hub 100 also includes cover mounting fastener threads 164 for receiving a fastener utilized to mount a cover or a fixture to the electrical wiring hub 100. Additionally, a perimeter locking collar 196 can be optionally utilized alone or in combination with the assembly fasteners 198 to maintain the assembly of the electrical wiring hub 100. The conductors can be manufactured using a variety of conductive materials including but not limited to metallic or non-metallic conductors generated from a variety of processes including forming, stamping, and casting, among others. The conductors of alternative embodiments may be implemented in a non-circular configuration where, for example, the hub housing is non-circular. Similarly, the conductors may be configured in numerous different cross-sections including, but not limited to, round, rectangular, or triangular, among others. Other materials or methods of manufacture are contemplated within the scope and spirit of this disclosure.

Figure 7:
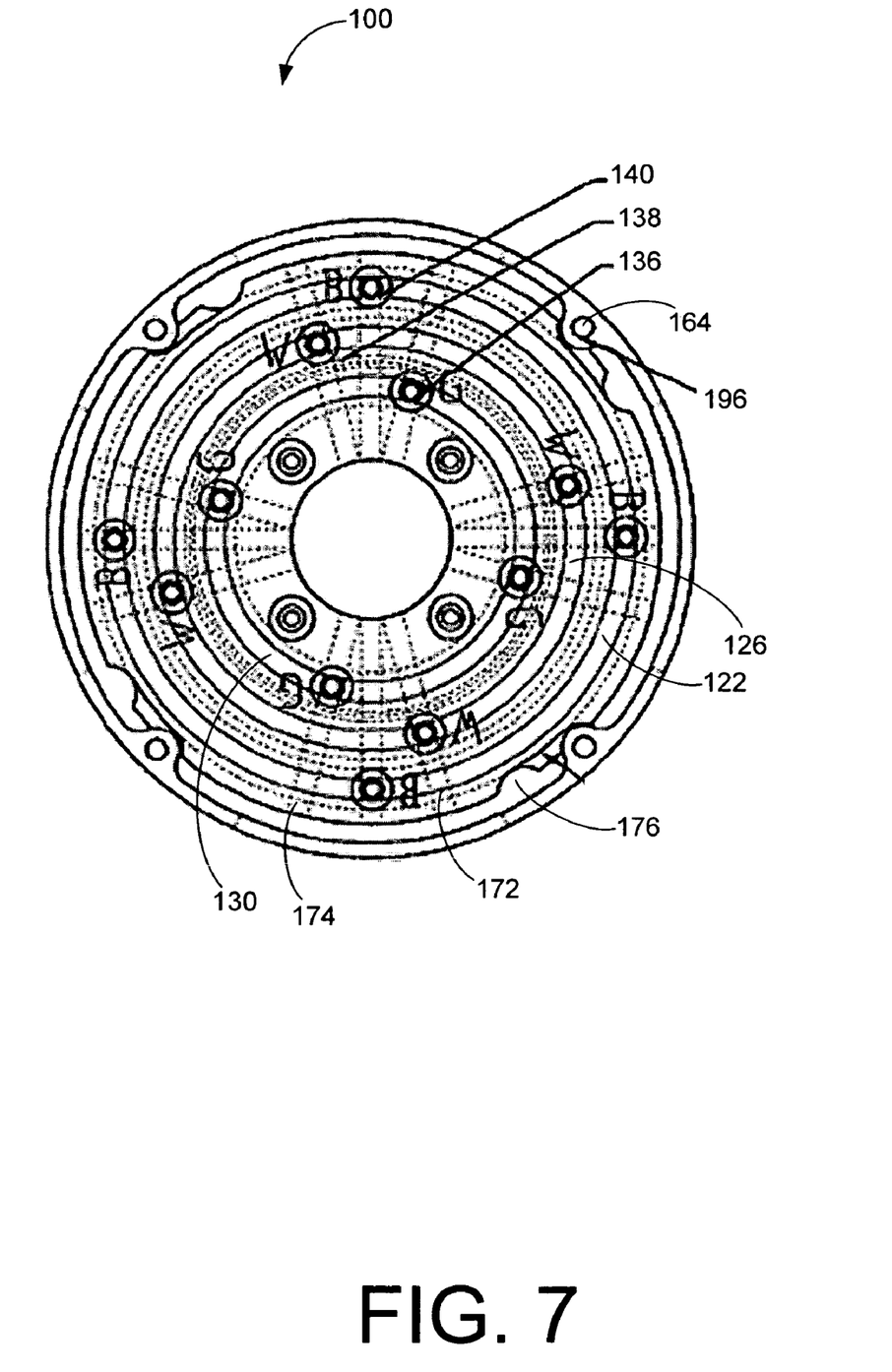
FIG. 7 is a top view illustrating an embodiment of an apparatus and corresponding internal structures for providing an electrical wiring hub as disclosed herein.

Reference is now made to FIG. 7, which is a top view illustrating an embodiment of an apparatus and exemplary internal structures for providing an electrical wiring hub. The electrical wiring hub 100 includes a first conductor ring 130, a second conductor ring 126, and a third conductor ring 122. The radial position of the first, second, and third circuit termination fastener cavities 140, 138, and 136 correspond to the radii of the first, second, and third conductor rings 130, 126, and 122, respectively. For example, the first circuit termination fastener cavities 136 are arranged corresponding to the radius of the first conductor ring 130.

The electrical wiring hub 100 also includes a first circuit wire channel 174, a second circuit wire channel 172, and a third circuit wire channel 142. Each of the wire channels extends axially from the center of the hub at the angular position corresponding to the termination fastener cavities 140, 138, and 136. For example, the first circuit wire channels 174 are located at the same angular position as the first circuit termination fastener cavities 136. In this manner, wires can be inserted into the channel corresponding to a specific circuit and the termination fastener at that location can be utilized to create and maintain a conductive engagement between the wires and the conductor ring.

The electrical wiring hub 100 also includes an assembly guide section 176, which is a relief area for receiving a perimeter locking collar 196 during assembly. The combination of the perimeter locking collar 196 and the assembly guide section 176 can be used optionally and alternatively in combination with the assembly fasteners to maintain the relative positions of the nub housing, the conductor mount, the conductor retainer, and the conductor rings. Cover mounting fastener threads 164 are configured to receive fasteners that are utilized to secure a cover or a fixture.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. An electrical wiring apparatus, comprising:
   a hub housing, configured to receive a plurality of wires and having a relief configured to receive a conductor ring;
   a conductor ring, configured for receipt within the hub housing relief and to conduct electrical current from one of the plurality of wires to another of the plurality of wires;
   a conductor mount, configured to receive the conductor ring; and
   a conductor retainer, configured engage the hub housing and the conductor mount, the conductor mount further configured to maintain a position of the conductor ring.

2. The apparatus of claim 1, further comprising a plurality of conductor rings, wherein each of the plurality of conductor rings comprises a different diameter.

3. The apparatus of claim 1, further comprising a plurality of assembly fasteners configured to maintain relative positions of the hub housing, the conductor mount, the conductor retainer and the conductor ring.

4. The apparatus of claim 1, further comprising second and third conductor rings, wherein the conductor mount comprises a second relief for receiving the second conductor ring and a third relief for receiving the third conductor ring.

5. The apparatus of claim 1, further comprising a plurality of termination fasteners configured to secure the plurality of wires to the conductor ring, wherein the conductor ring corresponds to a branch in an electrical power supply circuit.

6. The apparatus of claim 5, wherein the conductor retainer is configured to receive the plurality of termination fasteners.

7. The apparatus of claim 1, further comprising a perimeter locking mechanism configured to maintain relative positions of the hub housing, the conductor mount, the conductor retainer and the conductor ring.

8. The apparatus of claim 7, wherein the perimeter locking mechanism comprises:
   a collar integrated into the perimeter of the hub housing, wherein each of the collar comprises a cavity for receiving an apparatus fastener configured to secure the apparatus to a mounting surface; and
   an assembly guide section formed into the conductor retainer and corresponding to and substantially complementary to the collar.

9. The apparatus of claim 8, wherein the guide section is configured to receive the collar when the conductor retainer is inserted into the hub housing.

10. The apparatus of claim 9, wherein when the conductor retainer is inserted beyond the collar, the conductor retainer is rotated relative to the hub housing to a locked position.

11. The apparatus of claim 1, wherein the hub housing comprises:
    a bottom wall having a first side and a second side;
    at least one side wall extending from the first side of the bottom wall; and
    at least one cavity formed in the at least one side wall, configured to receive a portion of the plurality of wires.

12. The apparatus of claim 1, wherein the conductor mount comprises:
    a first surface configured to engage a first side of a bottom wall of the hub housing;
    a second surface that is parallel to the first surface, wherein the distance between the first surface and the second surface create a first thickness;
    a third surface that is parallel to the first surface,
       wherein the distance between the first surface and the third surface create a second thickness,
       wherein the first surface has a surface area substantially equal to a sum of the second surface and the third surface,
       wherein the first, second, and third surfaces are coaxial, and
       wherein the second thickness is greater than the first thickness;
    a first recess formed in the second surface, configured to receive a middle conductor ring of a plurality of conductor rings; and
    a second recess formed in the third surface, configured to receive an inner conductor ring of the plurality of conductor rings.

13. The apparatus of claim 1, wherein the conductor retainer comprises:
    a first side and a second side, wherein the second side includes a first surface and a second surface and is configured to be complementary to a plurality of surfaces on the conductor mount;
    a relief along a perimeter of the conductor retainer, configured to engage a surface on the hub housing in a complementary manner;
    a plurality of holes from the first side to the second side, configured to receive assembly fasteners; and
    a plurality of holes from the first side to the second side, configured to receive a plurality of termination fasteners, the termination fasteners configured to secure the plurality of wires to the conductor ring.

14. The apparatus of claim 1, wherein the conductor ring comprises an elongated metallic member formed into a substantially circular arrangement.

15. An electrical wiring apparatus, comprising:
    a hub housing, having an opening with a first shape and having a first groove corresponding to the first shape, the hub housing configured to receive a plurality of wires from a plurality of directions;
    a first conductor configured to be received by the first groove;
    a conductor mount, configured to be received by the opening and having a second groove configured to receive a second conductor and a third groove configured to receive a third conductor; and a conductor retainer, configured to engage the hub housing and retain the first conductor and further configured to engage the conductor mount and retain the second conductor and the third conductor.

16. The apparatus of claim 15, wherein the conductor mount comprises a plurality of channels configured to receive a plurality of wires in a plurality of positions adjacent the first conductor.

17. The apparatus of claim 15, wherein the conductor retainer comprises a plurality of channels configured to receive a plurality of wires in a plurality of positions adjacent the second conductor and the third conductor.

18. The apparatus of claim 15, further comprising a plurality of termination fasteners configured to secure the plurality of wires to the plurality of conductors in an electrically conductive arrangement.

19. An electrical wiring hub comprising:

a housing having a bottom wall and at least one side wall that extends outward from the bottom wall, the bottom wall and the at least one side wall together defining an interior space in which electrical connectivity can be achieved, the at least one side wall having a plurality of cavities through which wires can pass into the interior space from multiple directions around an outer periphery of the at least one side wall; and a retention component provided within the housing interior space, the retention component securing an endless conductor that forms a continuous loop within the interior space, the retention component comprising a plurality of horizontal channels through which wires that pass through the housing cavities can pass to make contact with the endless conductor, the retention component further comprising a plurality of vertical channels that align with the horizontal channels, the vertical channels being configured to receive termination fasteners that are used to maintain contact between the wires and the endless conductor.

20. The wiring hub of claim 19, wherein the endless conductor is disposed within a recess provided in one of the housing and the retention component.

21. The wiring hub of claim 19, wherein the endless conductor comprises an endless circular wire.

22. The wiring hub of claim 19, wherein the retainer member comprises a conductor mount that attaches to the housing and wherein the endless conductor is positioned between the conductor mount and the housing bottom wall.

23. The wiring hub of claim 22, further comprising a second endless conductor that forms a continuous loop within the housing interior space, wherein the retainer member further comprises a conductor retainer that attaches to the conductor mount, the second endless conductor being positioned between the conductor retainer and the conductor mount such that the second endless conductor is vertically spaced from the first endless conductor, the conductor retainer having a plurality of horizontal channels through which wires that pass through the housing cavities can pass to make contact with the second endless conductor.

24. The wiring hub of claim 23, further comprising a third endless conductor that forms a continuous loop within the housing interior space, the third endless conductor being positioned between the conductor retainer and the conductor mount in a manner in which the third endless conductor is vertically spaced from the second endless conductor, the conductor retainer having a second set of horizontal channels through which wires that pass through the housing cavities can pass to make contact with the third endless conductor.

25. An electrical wiring hub comprising:

a housing having a bottom wall and a continuous side wall that follows an outer periphery of the bottom wall, the bottom wall and the side wall together defining an interior space in which electrical connectivity can be achieved, the side wall having a plurality of cavities through which wires can pass into the interior space from multiple directions around an outer periphery of the side wall;

a first endless conductor wire provided within the housing interior space;

a conductor mount that attaches to the housing and secures the first endless conductor wire between the conductor mount and the housing bottom wall, the conductor mount comprising a plurality of horizontal channels that align with the plurality of housing cavities, the horizontal channels enabling wires to make contact with the first endless conductor wire, the conductor mount further comprising a plurality of vertical channels that align with the horizontal channels, the vertical channels being configured to receive termination fasteners that are used to urge the wires against the first endless conductor wire;

a second endless conductor wire provided within the housing interior space; and a conductor retainer that attaches to the conductor mount and secures the second endless conductor wire between the conductor retainer and the conductor mount such that the second endless conductor wire is vertically spaced from the first endless conductor wire, the conductor retainer comprising a plurality of horizontal channels that align with the plurality of housing cavities, the horizontal channels of the conductor retainer enabling wires to make contact with the second endless conductor wire, the conductor retainer further comprising a plurality of vertical channels that align with the horizontal channels of the conductor retainer, the vertical channels of the conductor retainer being configured to receive termination fasteners that are used to urge the wires against the second endless conductor wire;

wherein all wires that are passed into the housing interior space and make contact with the first endless conductor are electrically connected to a first electrical circuit and wherein all wires that are passed into the housing interior space and make contact with the second endless conductor are electrically connected to a second electrical circuit.

26. The electrical wiring hub of claim 25, wherein the housing bottom wall and the first and second endless conductor wires are substantially circular.

27. The electrical wiring hub of claim 25, further comprising a third endless conductor wire provided within the housing interior space, the third endless conductor wire being secured between the conductor retainer and the conductor mount in a manner in which the third endless conductor wire is vertically spaced from both the first and second endless conductor wires, the conductor retainer comprising a second set of horizontal channels that align with the plurality of housing cavities, the horizontal channels of the second set enabling wires to make contact with the third endless conductor wire, the conductor retainer further comprising a second set of vertical channels that align with the horizontal channels of the second set, the vertical channels of the second set being configured to receive termination fasteners that are used to urge the wires against the third endless conductor wire.

\* \* \* \* \*